United States Patent Office 3,337,570
Patented Aug. 22, 1967

3,337,570
SUBSTITUTED NICOTINIC ACIDS AND METHOD FOR THE MANUFACTURE THEREOF
Margaret H. Sherlock, Bloomfield, and Nathan Sperber, North Caldwell, N.J., assignors to Schering Corporation, Bloomfield, N.J., a corporation of New Jersey
No Drawing. Filed Oct. 23, 1965, Ser. No. 504,125
3 Claims. (Cl. 260—295.5)

This application is a continuation-in-part application of our co-pending application Ser. No. 329,999 filed Dec. 12, 1963, now abandoned.

The invention relates to the compositions of matter indentifiable in the art of chemistry as 2-anilino-nicotinic acids and to processes for making and using such compositions.

The invention sought to be patented in one of its composition aspects is described as residing in the concept of a chemical compound having the molecular structure of a 2-anilino-nicotinic acid having in the anilino portion of the molecule either 2-X,3-Y or 3-X,5-Y substituents in the phenyl group thereof, wherein X is a member of the group consisting of methyl, methoxy, chloro, bromo and trifluoromethyl, Y is a member of the group consisting of chloro, bromo and trifluoromethyl, with the proviso that when the 3-position bears a trifluoromethyl substituent, the other positions may be unsubstituted. Included within this concept are the non-toxic pharmaceutically acceptable metal and ammonium salts of the aforementioned anilino nicotinic acids and other hereinafter disclosed equivalents.

The invention sought to be patented in another of its composition aspects resides in the concept of pharmaceutical dosage forms containing a novel compound of this invention.

The invention sought to be patented in one of its process aspects is described as residing in the concept of heating together certain 2-substituted nicotinic acids, or the alkyl esters thereof, with an appropriately substituted aniline either in a high boiling inert solvent or by melting the two reactants in each other's presence.

The invention sought to be patented in its use aspect is described as residing in the concept of treating and alleviating inflammation and inflammatory conditions by administering a therapeutically effective quantity of a novel compound of this invention. Another aspect is that wherein a novel compound of this invention is used to cause an analgesic effect. Another use aspect of this invention is the use of therapeutic compositions which, in addition to the novel compounds of this invention, contain other active ingredients to provide desirable complementary effects when employed in the treatment of inflammatory conditions and in the treatment of pain.

The tangible embodiments of the invention, in the form of the free acid or non-toxic salt thereof, possess the inherent applied use characteristics of exerting an anti-inflammatory response as determined by pharmacological evaluation, and also exert an analgesic action. They are thus useful in treating inflammation and at higher doses in treating certain symptoms of pain.

The treatment of inflammation with concomitant absence of side effects induced by the anti-inflammatory agent has been a goal long sought. In general, steroids having cortisone-like activity have been employed for this purpose. The use of steroid therapy suffers from the drawback of side effects induced by the corticoid such as electrolyte imbalance, water retention and the like. Our novel compositions are rather specific in their action and are non-steroidal in character, thus the side effects due to steroid therapy are eliminated. It is also known that non-steroidal compounds employed in the treatment of inflammatory conditions have been found to exhibit deleterious side effects, such as for example—ulceration of the gastrointestinal tract. By the employment of standard laboratory techniques the novel compounds of this invention have demonstrated a marked lessening of this ulcerative effect and thus, although the anti-inflammatory compounds of this invention may demonstrate less potency than other previously used compounds the lack of the aforementioned side effects enhances the functional use indices of the novel compounds of this invention.

A more specific representation of the tangible embodiments of this invention are the chemical compositions having the structural formula:

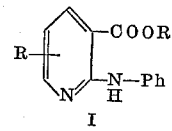

I including the non-toxic pharmaceutically acceptable metal and ammonium salts thereof wherein R is a member of the group consisting of H and methyl and Ph is a member of the group consisting of 2-X,3-Y-phenyl, and 3-X,5-Z-phenyl wherein X is a member of the group consisting of methyl, methoxy, chloro bromo and trifluoromethyl, Y is a member of the group consisting of chloro, bromo and trifluoromethyl with the proviso that when Y is trifluoromethyl, X may be hydrogen, and Z is a member of the group consisting of chloro, bromo and trifluoromethyl.

The compounds are preferably prepared by heating together a 2-halo (preferably chloro or bromo) nicotinic acid with an appropriately substituted aniline, said heating taking place either in a high boiling solvent such as xylene or cymene, or by merely melting the reactants in the presence of each other. In the melt procedure, the reaction temperature will rise as the reaction proceeds. The reaction is completed generally after 15–30 minutes as evidenced by a fall in reaction temperature. The fused melt is then treated with dilute aqueous base for example, sodium carbonate or sodium hydroxide, and extracted with a water immiscible solvent. The product, in the form of a soluble salt, is in the aqueous layer and is precipitated therefrom by acidifying with dilute mineral acid and filtered.

During the course of the reaction, for each mole of reaction product there is formed a mole of hydrogen halide. Accordingly, we prefer to employ 2 moles of the substituted aniline for each mole of the 2-halo-nicotinic acid reactant. The extra mole of the former readily takes up the hydrogen halide formed in the form of an acid addition salt.

Alternatively, there may be employed an ester (lower alkyl) of the halogeno nicotinic acid. The ester group is subsequently hydrolyzed. (During the reaction with the substituted aniline, hydrolysis may occur but the alcohol produced thereby is easily removed during the purification.)

In addition to the use of the reactants in the above described nucleophilic displacement reaction, other equivalently functioning reactants may be employed to produce the desired novel compositions of this invention. For example, instead of employing a 2-halo-nicotinic acid (or ester thereof) a nicotinic acid (or ester thereof) having an alkoxy, alkythio, methoxysulfonyl, nitro, or other equivalently functioning substituent in the 2-position thereof may be so employed. In such instances, the same reaction conditions used in the previously described nucleophilic displacement reaction would be employed. Alternatively, an N-substituted aniline reactant may be heated with the foregoing 2-substituted nicotinic acids (or esters thereof) instead of employing the previously described anilines. Such equivalently functioning N-substituted aniline reactants include those 2-X,3-Y- and 3-X,5-Y-substituted anilines wherein a hydrogen atom attached to the nitrogen atom has been replaced with substituents such as benzyl, alkyl or acyl. Again, in the use of these equivalently functioning reactants the previously described nucleophilic displacement reaction conditions would be employed. In those instances wherein the N-substituted aniline reactant has been employed, the 2-(N-substituted anilino) nicotinic acid (or ester thereof) may be subjected to catalytic reduction procedures to remove the alkyl, benzyl, or acyl radical from the nitrogen atom. The foregoing reaction may be summarized by the following schematic representation:

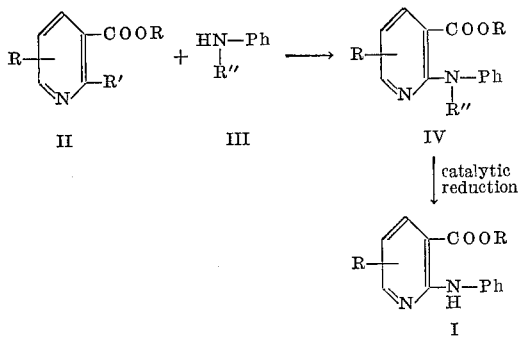

wherein R is either hydrogen or lower alkyl, R' may be lower alkyl, acyl or benzyl, and Ph represents a substituted phenyl of the following formulae

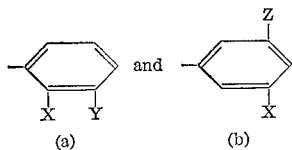

wherein X is a member of the group consisting of methyl, methoxy, chloro, bromo and trifluoromethyl, and each of Y and Z are members of the group consisting of chloro, bromo and trifluoromethyl with the proviso that when X is trifluoromethyl Z may be hydrogen.

Additionally, the compounds embraced within the concepts of this invention may also be prepared from 2-amino nicotinic acids (or esters thereof) by means of a nucleophilic displacement reaction with an appropriately substituted phenyl halide. As in the previously described nucleophilic displacement reaction the preparation is effected by heating the reactants together, in a sealed tube, either in a high boiling solvent such as xylene, cymene or by merely melting the reactants in the presence of each other.

The foregoing reaction may be summarized by the following schematic representation:

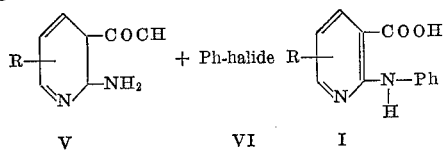

wherein R and Ph are as previously defined.

The compounds prepared according to the foregoing procedures are, in general crystalline solids purified by crystallization from aqueous alcohol, benzene, ethyl acetate, isopropanol, or other appropriate solvents.

Representative of the aniline reactants are 2,3-dichloro-aniline, 2-methyl-3-chloro-aniline, 2,3-dibromoaniline, 2-methyl-3-bromoaniline, 3,5-dibromoaniline, 3,5-dichloro-aniline, 3-trifluoromethyl-aniline, 2-methoxy-3-chloroaniline, as well as those required to prepare the hereinafter described equivalently functioning anilino nicotinic acids.

The preferred nicotinic acids which are utilizable in this reaction are 2-chloro(or bromo)-nicotinic acid and alkyl substitution products thereof such as 2-chloro-6-methyl nicotinic acid and other readily available or preparable 2-halogeno-lower alkyl nicotinic acids.

As indicated heretofore, anti-inflammatory therapy by means of adrenocorticosteroids is sometimes limited in its application in view of certain hormonal side effects. The anilino nicotinic acids described herein are apparently free of such hormonal side effects.

It is known that the potencies of drugs in delaying the appearance of erythema on the skin of albino guinea pigs subjected to irradiation with ultra violet light are closely correlated with their potencies as anti-inflammatory agents. The U.V. erythema test is a standard pharmacological test for determining anti-inflammatory activity certain agents exhibiting anti-inflammatory activity in this test are also analgesic with carry-over to different species having been demonstrated. Such agents include phenylbutazone, aspirin and antipyrine.

We have found that the anilino nicotinic acids described herein exhibit an activity as evidenced by the U.V. erythema test equal to or greater than that of the commonly used nonsteroid anti-inflammatory agent, phenylbutazone. Thus, the anilino nicotinic acids described herein are useful in treating inflammation, especially that associated with rheumatoid and osteoporosis joint diseases, collagen diseases, bursitis, gouty arthritis, spondylitis and the like.

The anilino nicotinic acids of this invention will elicit an anti-inflammatory response when administered in a dose range of about 100 to 500 mg. daily. In animals a dose of about 5 mg. per kg. body weight is sufficient to elicit an anti-inflammatory response of the compounds described herein; 2 - (2,3-dichloroanilino)-nicotinic acid and 2-(2-methyl-3 - chloroanilino)-nicotinic acid appear most potent especially in comparison with the standard phenylbutazone in protecting the animals against a lethal irradiation of ultra violet light. In addition, these compounds, especially 2 - (3-trifluoromethylanilino)-nicotinic acid elicit an antipyretic effect demonstratable pharmacologically.

The pharmacological activity of the tangible embodiments of this invention appear to be critically dependent on structure. Shifting the carboxyl group as would exist in a picolinic or isonicotinic acid moiety results in obliteration or extreme diminution of anti-inflammatory activity. The substituents and their position in the anilino moiety also appears most important to maintain the proper degree of utility. Unsubstituted or mono-substituted anilino-nicotinic acids are either inactive or exhibit such a low order as to be of no use. We have discovered that if substituents, such as those described heretofore, are placed in the ortho and the metal positions, the compound produced thereby has a high order of anti-inflammatory activity. One exception has been noted with regard to a monosubstitution product, namely, the m-trifluoromethyl analog which peculiarly exhibits an order or activity equivalent to the disubstituted anilino nicotinic acids described herein. However, as is true for most novel classes of compounds, once certain requirements are established for therapeutic activity it becomes rather obvious to prepare compounds having slight molecular modifications which do not substantially alter the kind of physiological activity, but rather merely change the degree of activity. Such compounds are considered as the full equivalents of compounds defined in Formula I, and as such are embraced within the claimed concepts. These equivalents include those compounds which contain an additional halogen (preferably chloro or bromo), alkyl (preferably methyl), lower alkoxy (preferably methoxy) or a trifluoromethyl substituent to form a 2-(2,3,6-tri-substituted anilino) nicotinic acid or a 2-(2,3,5 tri-substituted anilino) nicotinic acid. Exemplary of such compounds are 2-(2,3,6-trichloroanilino)-nicotinic acid, 2-(2,6-dichloro-3-methylanilino)-nicotinic acid and the like. Similarly, it is readily expected that the preparation of 2-(N-substituted-anilino) nicotinic acids, wherein said N-substituent may be acyl or lower alkyl, will result in equivalently functioning compounds. Representative of such compounds are 2-(N-methyl-2-methyl-3-chloroanilino) nicotinic acid, 2-(N-propionyl-2-methyl-3-chloroanilino) nicotinic acid, and the like. Such compounds are also deemed equivalent, and, as such are part of the claimed concepts of this invention. These N-alkyl and N-acyl compounds may be prepared from the above described procedures by the utilization of the properly substtiuted N-alkyl or N-acyl aniline reactants, or preferably by N-acylation of the anilino nicotinic acid.

The following examples are illustrative of the methods of synthesis of the tangible embodiments of this invention:

EXAMPLE 1

*2-(2-methyl-3-chloro-anilino)-nicotinic acid*

Mix 15.7 g. (0.1 mole) of 2-chloronicotinic acid with 28.2 g. (0.2 mole) of 2-methyl-3-chloroaniline. Stir the mixture and heat to 120–130° C. (the temperature will rise to about 175–200° C. as the reaction proceeds). After the reaction is completed as evidenced by a fall in temperature, cool the mass and triturate in dilute hydrochloric acid. Filter and wash the solid with water. Recrystallize from isopropyl acetate, M.P. 233–235° C.

Alternatively, the compound of this example (2-(2-methyl-3-chloro-anilino)-nicotinic acid) is prepared by heating together 30 g. of ethyl - 2 - chloronicotinate and 45.6 g. of 2-methyl-3-chloro-aniline at 200° C. for 10 minutes. Cool, dissolve in 100 ml. hot ethanol, cool and filter obtaining the ethyl ester of this example, M.P. 77.5–79° C.

Dissolve 30.8 g. of the ethyl ester in a solution of 13.25 g. of potassium hydroxide in 1 liter of methanol. Heat on a steam bath overnight allowing the methanol to evaporate. Dissolve the residue in water, acidify with dilute hydrochloric acid and filter obtaining the acid of this example.

Alternatively the 2 - chloronicotinic acid may be replaced with equivalent quantities of 2-methoxy nicotinic acid, 2 - methylthionicotinic acid, 2 - methoxysulfonylnicotinic acid, 2 - nitronicotinic acid, and by following substantially the same procedures outlined in this example there is produced the desired 2 - (2 - methyl-3-chloroanilino)-nicotinic acid.

Similarly, the 2-methyl-3-chloroaniline may be substituted with equivalent quantities of 3-trifluoromethylaniline, 2,3-dichloroaniline, 3, 5-di-trifluoromethylaniline, 3,5-dichloroaniline, 2-methyl-3-bromoaniline, 2-methyl-3-trifluoromethylaniline, 2-methoxy - 3 - chloroaniline, 2-methoxy-3-bromoaniline, 2-methoxy - 3 - trifluoromethylaniline, 2-chloro-3-bromoaniline, 2,3-di-trifluoromethylaniline, 3-methyl - 5 - chloroaniline, 3-methyl-5-bromoaniline, 3-methyl-5-trifluoromethylaniline, 3-methoxy-5-chloroaniline, 3-methoxy-5-bromoaniline, 3-methoxy-5-trifluoromethylaniline, 3-chloro-5-bromoaniline, 3-chloro-5-trifluoromethylaniline, 3,5-dibromoaniline, 3-trifluoromethyl-5-chloroaniline, 3-trifluoromethyl-5- bromoaniline, 2,3,5-tribromoaniline, 2,3,5-trichloroaniline, 2,6-dichloro-3-methylaniline, N-methyl-2-methyl-3-chloroaniline, and N-propionyl-2-methyl-3-chloroaniline, and by reacting said aniline reactants with 2-chloronicotinic acid (or with the equivalently functioning nicotinic acid such as 2-bromonicotinic acid, 2-methoxynicotinic acid, 2-methythionicotinic acid and 2-methoxysulfonylnicotinic acid or 2-nitronicotinic acid) substantially according to the procedures outlined for this example there is produced 2-(3-trifluoromethylanilino)-nicotinic acid, 2-(2,3-dichloroanilino)-nicotinic acid, 2-(3,5-di-trifluoromethylanilino)-nicotinic acid, 2-(3,5-dichloroanilino)-nicotinic acid, 2-(2-methyl-3-bromoanilino)-nicotinic acid, 2-(2-methyl-3-trifluoromethylanilino)-nicotinic acid, 2-(2-methoxy-2-chloroanilino)-nicotinic acid, 2-(2-methoxy - 3 - bromoanilino)-nicotinic acid, 2-(2-methoxy-3-trifluoromethylanilino)-nicotinic acid, 2-(2-chloro-3-bromoanilino)-nicotinic acid, 2-(2,3-di-trifluoromethylanilino)-nicotinic acid, 2-(3-methyl-5-chloroanilino)-nicotinic acid, 2-(3-methyl-5-bromoanilino)-nicotinic acid, 2-(3-methyl-5-trifluoromethylanilino)-nicotinic acid, 2-(3-methoxy-5-chloroanilino)-nicotinic acid, 2-(3-methoxy-5-bromoanilino-nicotinic acid, 2-(3-methoxy-5-trifluoromethylanilino)-nicotinic acid, 2-(3-chloro-5-bromoanilino)-nicotinic acid, 2-(3-chloro-5-trifluoromethylanilino)-nicotinic acid, 2-(3,5-dibromo-anilino)-nicotinic acid, 2-(3-trifluoromethyl-5-chloro-anilino)-nicotinic acid, 2-(3-trifluoromethyl-5-bromo-anilino)-nicotinic acid, 2-(2,3,5-tribromo-anilino)-nicotinic acid, 2-(2,3,5-trichloroanilino)-nicotinic acid, 2-(2,6-dichloro-3-methylanilino)-nicotinic acid, 2-(N-methyl-2-methyl - 3 - chloroanilino)-nicotinic acid, 2-(N-propionyl-2-methyl-3-chloroanilino)-nicotinic acid respectively. In those instances wherein a particular reactant is not specifically described in the literature, such reactants may be prepared according to the methods used to prepared according to the methods used to prepare the known reactants suitable for the foregoing reactions.

EXAMPLE 2

*2-(2,3-dichloro-analino)-nicotinic acid*

Mix 19.5 g. (0.1 mole) of potassium 2-chloronicotinate, 32.4 (0.2 mole) of 2,3-dichloroaniline, 1 g. copper powder and 100 ml. of n-amyl alcohol. Stir and reflux for 6 hours. Cool, make alkaline with sodium bicarbonate solution. Steam-distil to remove unreacted 2,3-dichloroaniline. Cool the pot residue, filter and extract the filtrate with ether. Separate the aqueous phase, acidify and filter. Recrystallize from isopropyl acetate, M.P. 250–251° C.

EXAMPLE 3

*2-(3-trifluoromethyl-anilino)-nicotinic acid*

Mix 5 gms. of 2-amino nicotinic acid, 8 gms. of m-bromo-trifluoromethylbenzene, 2 gms. of potassium carbonate and 0.5 gms. of copper powder in 20 ml. of water, and in a sealed tube, heat the resulting mixture at 160° C. for 8 hours. Break the seal, cool the mass, make alkaline with sodium bicarbonate and steam-distil to remove the unreactive m-bromo-trifluoromethylbenzene. Cool, acidify, and filter the residue to obtain the desired product which is recrystallized from isopropyl acetate.

The tangible embodiments of this invention are acids and indeed are soluble in aqueous alkali. The alkali metal salts of the novel compounds may be prepared by methods well known in the art for the preparation of a salt of a strong base with a weak acid. For example, the alkali metal salt, preferably the sodium salt may be obtained by evaporation of an alkaline (with sodium hydroxide) solution of the anilino-nicotinic acid described herein. Alternatively, non-aqueous media may be employed. For example, by mixing together an alcoholic solution of an anilino-nicotinic acid with an alcoholic solution containing a stoichiometric quantity of an alkali metal alkoxide and after evaporating the solvent, there is obtained the alkali metal salt which is soluble in water. In similar fashion and by other known techniques other functional derivatives—i.e., other non-toxic pharmaceutically acceptable salts are prepared. Representative of such salts are, in addition to sodium, those wherein the cation is ammonium, potassium, lithium, calcium, aluminum and other such metals which advantageously allow for greater solubility or greater ease in formulation and are considered the full equivalent of the free carboxylic acid. Also included within this class of functional derivatives are the hydroxamic acid derivatives which are obtained by the condensation of an alkyl ester of the hereinabove described anilino nicotinic acids with hydroxylamine hydrochloride in sodium methoxide.

The compositions described herein may be administered parenterally or enterally by incorporating them into dosage forms such as tablets, capsules, elixirs, solutions, suspensions and the like. Representtive embodiments of the formulations containing the compositions of this invention are as follows:

TABLET FORMULATIONS

I. *Formula and method of manufacture for 2-(2-methyl-3-chloroanilino)-nicotinic acid*

ENTERIC COATED TABLETS

| Formula | Mg./core |
|---|---|
| 2-(2-methyl-3-chloroanilino-nicotinic acid | 100.0 |
| Citric acid | 1.0 |
| Lactose, USP | 33.5 |
| Dicalcium phosphate | 70.0 |
| Pluronic F-68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol, 50 ml./1000 cores | |
| Corn starch | 30.0 |
| Dry: | |
|     Sodium lauryl sulfate | 3.0 |
|     Magnesium stearate | 3.0 |
| Tablet weight | 350.0 |

*Procedure.*—The 2-(2-methyl-3-chloroanilino) - nicotinic acid is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

*Coating.*—The above cores are treated with a lacquer and dusted with talc to prevent moisture adsorption. Sub-coat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

II. *Combinations of 2-(2-methyl-3-chloroanilino-nicotinic acid with other drugs*

A. 2-(2-METHYL-3-CHLOROANILINO)-NICOTINIC ACID AND BETAMETHASONE

| Formula | Mg./tablet |
|---|---|
| 2-(2-methyl-3-chloroanilino)-nicotinic acid | 100.000 |
| Betamethasone | [1] 0.645 |
| Citric acid | 1.000 |
| Lactose | 32.855 |
| Dicalcium phosphate | 70.000 |
| Pluronic, F-68 | 30.000 |
| Sodium lauryl sulfate | 15.000 |
| Polyvinylpyrrolidone | 15.000 |
| Carbowax 1500 | 4.500 |
| Carbowax 6000 | 45.000 |
| 3A alcohol, 50 ml./1000 tablets | |
| Corn starch | 30.000 |
| Dry: | |
|     Sodium lauryl sulfate | 3.00 |
|     Magnesium stearate | 3.00 |
| Tablet weight | 350.00 |

[1] Includes 7½% excess.

*Procedure.*—Mix together 2 - (2-methyl-3-chloroanilino)-nicotinic acid, citric acid, pluronic, sodium lauryl sulfate, lactose and dicalcium phosphate. Screen through No. 60 mesh screen. Granulate the above mixed powders with an alcoholic solution containing Betamethasone, polyvinylpyrrolidone, carbowax 1500 and 6000. Add additional alcohol, if necessary, to bring powder mix to a pasty mass. Add corn starch and continue mixing until uniform damp granules are formed. Pass damp granulation through a No. 10 screen, tray and dry in oven at 100° C. for 12–14 hours. Reduce dried granulation through a No. 16 screen, add sodium lauryl sulfate and magnesium sulate mix and compress on a tablet machine to specifications.

B. 2-(2-METHYL-3-CHLOROANILINO)-NICOTINIC ACID AND PHENYLBUTAZONE

| Formula | Mg./tablet |
|---|---|
| 2-(2-methyl-3-chloroanilino)-nicotinic acid | 100.00 |
| Phenylbutazone | 100.00 |
| Dried aluminum hydroxide gel | 100.00 |
| Lactose | 50.00 |
| Dicalcium phosphate | 59.00 |
| Pluronic, F-68 | 60.00 |
| Sodium lauryl sulfate | 30.00 |
| Polyvinylpyrrolidone | 30.00 |
| Carbowax 1500 | 9.00 |
| Carbowax 6000 | 90.00 |
| 3A alcohol, 90 ml./1000 tablets | |
| Corn starch | 60.00 |
| Dry: | |
|     Sodium lauryl sulfate | 6.00 |
|     Magnesium stearate | 6.00 |
| Tablet weight | 700.00 |

*Procedure.*—Mix together 2 - (2-methyl-3-chloroanilino)-nicotinic acid, pluronic, sodium lauryl sulfate, lactose and dicalcium phosphate. Screen through No. 60 mesh screen. Granulate the above mixed powders with an alcoholic solution containing Betamethasone, polyvinylpyrrolidone, Carbowax 1500 and 6000. Add additional alcohol, if necessary, to bring powder mix to a pasty mass. Add corn starch and continue mixing until uniform damp granules are formed. Pass damp granulation through a No. 10 screen, tray and dry in oven at 100° C. for 12–14 hours. Reduce dried granulation through a No. 16 screen, add sodium lauryl sulfate and magnesium sulfate mix and compress on a tablet machine to specifications.

C. 2-(2-METHYL-3-CHLOROANILINO)-NICOTINIC ACID AND ASPIRIN

| Formula | Mg./tablet |
|---|---|
| Gran. I acetylsalicylic acid, cryst. | 300.00 |
| Gran. II 2-(2-methyl-3-chloroanilino)-nicotinic acid | 100.00 |
| Citric acid | 1.00 |
| Lactose | 30.50 |
| Dicalcium phosphate | 70.00 |
| Pluronic, F-68 | 30.00 |
| Sodium lauryl sulfate | 15.00 |
| Polyvinylpyrrolidone | 15.00 |
| Carbowax 1500 | 4.50 |
| Carbowax 6000 | 45.00 |
| 3A alcohol, 50 ml./1000 tab. | |
| Corn starch | 30.00 |
| Dry: | |
|     Sodium lauryl sulfate | 3.00 |
|     Sterotex | 6.00 |
| Tablet weight | 650.00 |

*Procedure.*—Mix together 2 - (2-methyl-3-chloroanilino)-nicotinic acid, citric acid, pluronic, sodium lauryl sulfate, lactose and dicalcium phosphate. Screen through No. 60 mesh screen. Granulate the above mixed powders with an alcoholic solution containing Betamethasone, polyvinylpyrrolidone, Carbowax 1500 and 6000. Add additional alcohol, if necessary, to bring powder mix to a pasty mass. Add corn starch and continue mixing until uniform damp granules are formed. Pass damp granulation through a No. 10 screen, tray and dry in oven at 100° C. for 12–14 hours. Reduce dried granulation through a No. 16 screen, add sodium lauryl sulfate and magnesium sulfate mix and compress on a tablet machine to specifications. To the dried screened portion of Granulation II, add crystalline acetylsalicylic acid, 20 mesh and mix for 30 minutes. Add sodium lauryl sulfate and Sterotex mix and compress into tablets on tablet machine to desired specifications.

III. Capsule formulations

A. Formula

| | Mg./capsule |
|---|---|
| 2-(2-methyl-3-chloroanilino)-nicotinic acid | 100.00 |
| Citric acid | 1.00 |
| Pluronic, F–68 | 40.00 |
| Sodium lauryl sulfate | 20.00 |
| Lactose | 238.00 |
| Magnesium stearate | 1.00 |
| | 400.00 |

*Procedure.*—Mix together 2 - (2-methyl-3-chloroanilino)-nicotinic acid, citric acid, pluronic, sodium lauryl sulfate and lactose. Pass through a No. 80 screen. Add magnesium stearate, mix and encapsulate into the proper size 2 piece gelatin capsule.

B. Formula

| | Mg./capsule |
|---|---|
| 2-(2-methyl-3-chloroanilino)-nicotinic acid | 100.0 |
| Dried aluminum hydroxide gel | 100.0 |
| Citric acid | 1.0 |
| Pluronic, F–68 | 50.0 |
| Sodium lauryl sulfate | 25.0 |
| Lactose | 222.0 |
| Magnesium stearate | 2.0 |
| | 500.00 |

*Procedure.*—Mix together 2 - (2-methyl-3-chloroanilino)-nicotinic acid, citric acid, pluronic, sodium lauryl sulfate and lactose. Pass through a No. 80 screen. Add magnesium stearate, mix and encapsulate into the proper size 2 piece gelatin capsule adding the dried aluminum hydroxide gel to the mixture before screening.

C. Formula

| | Mg./capsule |
|---|---|
| 2-(2-methyl-3-chloroanilino)-nicotinic acid | 100.0 |
| Acetylsalicylic acid, 80 mesh | 300.0 |
| Citric acid | 1.0 |
| Pluronic, F–68 | 60.0 |
| Sodium lauryl sulfate | 34.0 |
| Talc | 15.0 |
| | 500.0 |

*Procedure.*—Mix together 2 - (2-methyl-3-chloroanilino)-nicotinic acid, citric acid, pluronic, sodium lauryl sulfate and lactose. Pass through a No. 80 screen. Add magnesium stearate, mix and encapsulate into the proper size 2 piece gelatin capsule.

D. Formula

| | Mg./capsule |
|---|---|
| 2-(2-methyl-3-chloroanilino)-nicotinic acid | 100.000 |
| Betamethasone | [1] 0.645 |
| Dried aluminum hydroxide gel | 100.000 |
| Magnesium Oxide | 50.000 |
| Pluronic, F–68 | 50.000 |
| Sodium lauryl sulfate | 25.000 |
| Citric acid | 1.000 |
| Lactose | 171.355 |
| Magnesium stearate | 2.000 |
| | 500.00 |

[1] Includes 7½% excess.

E. Formula

| | Mg./capsule |
|---|---|
| 2-(2-methyl-3-chloroanilino)-nicotinic acid | 100.00 |
| Phenylbutazone | 100.00 |
| Dried aluminum hydroxide gel | 100.00 |
| Magnesium oxide | 50.00 |
| Pluronic, F–68 | 87.00 |
| Sodium lauryl sulfate | 60.00 |
| Citric acid | 1.00 |
| Magnesium stearate | 2.00 |
| | 500.00 |

*Procedure.*—Mix together 2 - (2-methyl-3-chloroanilino)-nicotinic acid, citric acid, pluronic, sodium lauryl sulfate and lactose. Pass through a No. 80 screen. Add magnesium stearate, mix and encapsulate into the proper size 2 piece gelatin capsule.

V. Oral suspension

Formula

| | | |
|---|---|---|
| 2-(2-methyl-3-chloroanilino)-nicotinic acid, micronized | mg./5 ml | 100.0 |
| Veegum, Vanderbilt | do | 50.0 |
| Standard granulated sugar, USP | do | 2500.0 |
| Sorbitol solution, USP | do | 1250.0 |
| Sodium saccharin, NF | do | 50.0 |
| Sodium benzoate, USP | do | 5.0 |
| Ethanol, USP | ml | 0.025 |
| Menthol, USP | mg./5 ml | 1.000 |
| Flavor | | Q.s. |
| Purified water, USP, to make 5 ml. | | |

*Method of manufacture.*—Dissolve the sodium sacchrin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the 2-(2-methyl-3-chloroanilino)-nicotinic acid with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

VI. Suppository

Formula

| | Mg./2 gms. |
|---|---|
| 2-(2-methyl-3-chloranilino)-nicotinic acid, micronized | 100 |
| Theobroma oil, Pharm. Grade to make 2 gms. | |

*Method of manufacture.*—Prepare a slurry of the 2-(2-methyl-3-chloroanilino)-nicotinic acid with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

Formula

| | Mg./2 gms. |
|---|---|
| 2 - (2-methyl-3-chloroanilino) - nicotinic acid, micronized | 100 |
| Polyethylene glycol 1000 | 1500 |
| Polyethylene glycol 4000, USP, to make 2 gms. | |

*Method of manufacture.*—Prepare a slurry of the 2-(2-methyl-3-chloroanilino)-nicotinic acid with a portion of the melted polyethylene glycol mixture. Pass the slurry through a suitable colloid mill until it is free of grittiness. Add sufficient melted polyethylene glycol mixture to bring the batch to final weight. Pour the melted mix, maintaining uniformity, into appropriately prepared molds and allow to cool.

VII. Topical ointment

Formula

| | Mg./gm. |
|---|---|
| 2-(2-methyl-3-chloroanilino)-nicotinic acid, micronized | 20.0 |
| Methylparaben, USP | 0.5 |
| Propylparaben, USP | 0.1 |
| Petrolatum, USP, to make 1 gm. | |

*Method of manufacture.*—Dissolve the parabens in the melted petrolatum. Prepare a slurry of the 2-(2-methyl-3-chloroanilino)-nicotinic acid with a portion of the paraben solution. Pass the slurry through a suitable colloid mill until free of grittiness. Add the slurry to the remainder of the paraben solution and mix while cooling to room temperature.

VIII. Topical ointment with steroid

Formula

| | Mg./gm. |
|---|---|
| 2-(2-methyl-3-chloroanilino)-nicotinic acid, micronized | 20.0 |
| Betamethasone alcohol | 2.0 |
| Methylparaben, USP | 0.5 |
| Propylparaben, USP | 0.1 |
| Petrolatum, USP, to make 1 gm. | |

*Method of manufacture.*—Dissolve the parabens in the melted petrolatum. Prepare a slurry of the 2-(2-methyl-3-chloroanilino)-nicotine acid and betamethasone alcohol with a portion of the paraben solution. Pass the slurry through a suitable colloid mill until free of grittiness. Add the slurry to the remainder of the paraben solution and mix while cooling to room temperature.

IX. Topical cream

Formula

| | Mg./gm. |
|---|---|
| 2-(2-methyl-3-chloroanilino)-nicotinic acid, micronized | 20.0 |
| Stearic acid, USP | 60.0 |
| Propylene glycol monostearate | 100.0 |
| Isopropyl myristate | 80.0 |
| Propylene glycol, USP | 30.0 |
| Polyoxyethylene sorbitan monopalmitate | 60.0 |
| Sorbitol solution, USP | 20.0 |
| Methylparaben, USP | 1.0 |
| Butyl p-hydroxybenzoate, Pharm. Grade | 4.0 |
| Purified water to make 1 gm. | |

*Procedure.*—The stearic acid, propylene glycol monostearate, isopropyl myristate and a portion of the polyoxyethylene sorbitan monopalmitate are melted together. A heated solution containing the sorbitol solution, methyl and propylparabens is added to the melted waxes and mixed while cooling until homogeneous.

The 2-(2-methyl-3-chloroanilino)-nicotinic acid with the remainder of the polyoxyethylene sorbitan monopalmitate and a portion of the purified water is passed through a colloid mill until it is free of grittiness. The milled slurry is added to the cream base and the entire product is mixed while cooling to room temperature until uniform.

X. Topical cream with steroid

Formula

| | Mg./gm. |
|---|---|
| 2-(2-methyl-3-chloroanilino)-nicotinic acid, micronized | 20.0 |
| Betamethasone alcohol | 2.0 |
| Stearic acid USP | 60.0 |
| Propylene glycol monostearate | 100.0 |
| Isopropyl myristate | 80.0 |
| Propylene glycol, USP | 30.0 |
| Polyoxyethylene sorbitan monopalmitate | 60.0 |
| Sorbitol solution, USP | 20.0 |
| Methylparaben, USP | 1.0 |
| Butyl p-hydroxybenzoate, Pharm. Grade | 4.0 |
| Purified water to make 1 gm. | |

*Procedure.*—The stearic acid, propylene glycol monostearate, isopropyl myristate and a portion of the polyoxyethylene sorbitan monopalmitate are melted together. A heated solution containing the sorbitol solution, methyl and propyl-parabens is added to the melted waxes and mixed while cooling until homogeneous.

The 2-(2-methyl-3-chloroanilino)-nicotinic acid and betamethasone alcohol with the remainder of the polyoxyethylene sorbitan monopalmitate and a portion of the purified water is passed through a colloid mill until it is free of grittiness. The milled slurry is added to the cream base and the entire product is mixed while cooling to room temperaure until uniform.

XI. Topical cream

Formula

| | Mg./gm. |
|---|---|
| 2-(2-methyl-3-chloroanilino)-nicotinic acid, micronized | 20.0 |
| Stearic acid, USP | 60.0 |
| Propylene glycol monostearate | 100.0 |
| Isopropyl myristate | 80.0 |
| Propylene glycol, USP | 30.0 |
| Polyoxethylene sorbitan monopalmitate | 60.0 |
| Sorbitol solution, USP | 20.0 |
| Methylparaben, USP | 1.0 |
| Butyl p-hydroxybenzoate, Pharm, Grade | 4.0 |
| Dimethyl sulfoxide | 300.0 |
| Purified water to make 1 gm. | |

*Procedure.*—The stearic acid, propylene glycol monostearate, ispropyl myristate, dimethyl sulfoxide and a portion of the polyoxyethylene sorbitan monopalmitate are melted together. A heated solution containing the sorbitol solution, methyl and propylparabens is added to the melted waxes and mixed while cooling until homogeneous.

The 2-(2-methyl-3-chloroanilino)-nicotinic acid with the remainder of the polyoxyethylene sorbitan monopalmitate and a portion of the purified water is passed through a colloid mill until it is free of grittiness. The milled slurry is added to the cream base and the entire product is mixed while cooling to room temperature until uniform.

XII. Topical cream with steroid

Formula

| | Mg./gm. |
|---|---|
| 2-(2-methyl-3-chloroanilino)-nicotinic acid, micronized | 20.0 |
| Betamethasone alcohol | 2.0 |
| Stearic acid, USP | 60.0 |
| Propylene glycol monostearate | 100.0 |
| Isopropyl myristate | 80.0 |
| Pyropylene glycol, USP | 30.0 |
| Polyoxyethylene sorbitan monopalmitate | 60.0 |
| Sorbitol solution, USP | 20.0 |
| Methylparaben, USP | 1.0 |
| Butyl p-hydroxpbenzoate, Pharm. Grade | 4.0 |
| Dimethyl sufoxide | 300.0 |
| Purified water to make 1 gm. | |

*Procedure.*—The stearic acid, propylene glycol monostearate, ispropyl myristate, dimethyl sulfoxide and a portion of the polyoxyethylene sorbitan monopalmitate are melted together.

A heated solution containing the sorbitol solution, methyl and propylparabens is added to the melted waxes and mixed while cooling until homogeneous. The 2-(2-methyl-3-chloroanilino)-nicotinic acid and betamethasone alcohol with the remainder of the polyoxyethylene sorbitan monopalmitate and the portion of the purified water is passed through a colloid mill until it is free of grittiness. The milled slurry is added to the cream base and the entire product is mixed while cooling to room temperature until uniform.

DOSAGE FORMS

I. Ophthalmic or optic suspension—sterile

| | Mg.(range 0.25 mg./ml.) |
|---|---|
| 2-(2-methyl-3-chloroanilino)-nicotinic acid, microppt | 10.0 |
| Sodium citrate | 10.0 |
| Benzalkonium chloride | .20 |
| Purified water ad q.s. 1 ml. | |

The 2-(2-methyl-3-chloroanilino)-nicotinic acid in prepared by sterile precipitation. Sterile precipitation is accomplished by filtering a concentrated organic solvent solution of the 2-(2-methyl-3-chloroanilino)-nicotinic acid and spraying into water under controlled aseptic conditions. Uniform small particle size results, this is then filtered and dried aseptically. The dried powder is then aseptically dispersed in a 10× solution of benzalkonium chloride, sodium citrates previously sterile filtered. When uniformly dispersed sufficient sterile distilled water is added to prepare the final volume.

Alternate buffers include:

| | Mg./ml. |
|---|---|
| Sodium phosphate dibasic | 0–5 |
| Sodium phosphate monobasic | 0–10 |
| Sodium acetate | 0–5 |

Alternate preservatives include:

| | Mg./ml. |
|---|---|
| Chlorobutanol | 0–5.0 |
| Phenylethyl alcohol | 0–5 |

Alternative wetting agents include:

| | Mg./ml. |
|---|---|
| Tween 80 | 0–5.0 |
| Triton WR 1339 | 0–5 |

II. Opthalmic durafilm

| | Mg. |
|---|---|
| 2-(2-methyl-3-chloroanilino)-nicotinic acid | 1.00 |
| Emulphor BL620 | 50.00 |
| Myrj 52S | 50.00 |
| Thiomersol | .020 |
| Sodium citrate | 10.00 |
| Disodium EDTA | .10 |
| Purified water ad q.s. 1 ml. | |

Prepared by heating surfactant phase with 2-(2-methyl-3-chloroanilino)-nicotinic acid and 70–80° C. until dissolved, then adding 75% of purified water at 70° C., and dissolving the remaining components in order listed. The product is prepared to final volume after cooling to 25° C. by addition of sufficient purified water. The product is filtered aseptically into a suitable container.

ALTERNATIVES

Buffers

| | Mg./ml. |
|---|---|
| Sodium phosphate dibasic | 0–10 |
| Sodium phosphate monobasic | 0–10 |
| Sodium acetate | 0–5 |

Preservatives

| | Mg./ml. |
|---|---|
| Benzalkonium chloride | 0–.2 |
| Chlorobutanol | 0–5 |
| Thiomersol | 0–.1 |
| Phenylmercuric nitrate/acetate | 0.02 |

WETTING AGENTS/DURAFILM COMPONENTS

| | Mg./ml. |
|---|---|
| Tween 20 | Up to 200 |
| Tween 80 | Up to 200 |
| Pluronic, F–68 | Up to 50 |

III. Parenteral suspension

| | Mg. |
|---|---|
| 2-(2-methyl-3-chloroanilino)-nicotinic acid microppt | 50.0 |
| Sodium citrate | 10.0 |
| Tween 80 | 1.0 |
| CMC 7 LP | 5.0 |
| Methylparaben, USP | 1.8 |
| Propylparaben, USP | .2 |
| Benzyl alcohol | 9.0 |
| Purified water ad q.s. 1 ml. | |

Sterile microppt 2-(2-methyl-3-chloroanilino)-nicotinic acid (alternatives micronized steam sterilized or mocronized ethylene oxide sterilized) is dispersed in a 10× sterile filtered concentrate of Tween 80 and sodium citrate. When dispersed a 1.33× sterile filtered vehicle of the remaining components is added. When uniformly dispersed sufficient water for injection is added to final volume. The product is then stored under aseptic conditions until packaged into multiple dose vials.

IV. Parenteral solution

| | Mg. |
|---|---|
| 2-(2-methyl-3-chloroanilino)-nicotinic acid | 50.0 |
| Benzyl alcohol | 15.0 |
| Benzyl benzoate | 200.0 |
| Polyethylene glycol 400, USP, q.s. ad 1.00 gm. | |

The product is prepared by heating the glycol to 80° C., dissolving the 2-(2-methyl-3-chloroanilino)-nicotinic acid, benzyl alcohol, then adding about 75% of the polyethylene glycol 400. Cool the batch to 25° C., add the remaining polyethylene glycol 400. Filter aseptically into a sterile container.

Alternative preservative—butyl parahydroxybenzoate 0–2.0 mg./ml.

We claim:
1. A compound of the group consisting of anilino nicotinic acids having the formula:

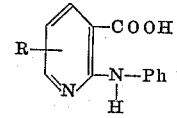

their lower alkyl esters, and non-toxic pharmaceutically acceptable salts thereof, wherein R is a member of the group consisting of hydrogen and methyl, and Ph is a member of the group consisting of phenyl substituted in the 3-position by Y and substituted in the 2-position by X, and phenyl substituted in the 3-position by X and substituted in the 5-position by Z wherein X is a member of the group consisting of methyl, methoxy, chloro, bromo and trifluoromethyl, Y and Z are each members of the group consisting of chloro, bromo and trifluoromethyl with the proviso that when Y is trifluoromethyl X may be hydrogen.

2. A compound of claim 1, wherein 2-X is methyl and Y is chloro, said compound being 2-(2-methyl-3-chloroanilino)-nicotinic acid.

3. A compound of claim 1, wherein 2-X is chloro, and Y is chloro, said compound being 2-(2,3-dichloroanilino) nicotinic acid.

References Cited

Kermack et al., J. Chem. Soc., London (1942), p. 726.

WALTER A. MODANCE, Primary Examiner.

A. L. ROTMAN, Assistant Examiner.